United States Patent
Do et al.

(10) Patent No.: US 9,813,866 B2
(45) Date of Patent: *Nov. 7, 2017

(54) METHODS AND APPARATUS FOR EFFICIENT TRANSPORT AND MANAGEMENT OF A POSITIONING AND TIMING ALMANAC

(71) Applicant: QUALCOMM Atheros, Inc., San Jose, CA (US)

(72) Inventors: Ju-Yong Do, Palo Alto, CA (US); Gengsheng Zhang, Cupertino, CA (US); Kin F. Wong, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/208,474

(22) Filed: Jul. 12, 2016

(65) Prior Publication Data
US 2016/0323710 A1 Nov. 3, 2016

Related U.S. Application Data

(63) Continuation of application No. 13/439,686, filed on Apr. 4, 2012, now Pat. No. 9,400,320.

(51) Int. Cl.
*H04W 4/02* (2009.01)
*G01S 19/05* (2010.01)
*G01S 5/02* (2010.01)

(52) U.S. Cl.
CPC .......... *H04W 4/023* (2013.01); *G01S 5/0236* (2013.01); *G01S 19/05* (2013.01); *H04W 4/021* (2013.01); *H04W 4/028* (2013.01)

(58) Field of Classification Search
CPC .... H04W 8/22; H04W 4/001; H04M 1/72525
USPC ................................................ 455/419, 456.3
See application file for complete search history.

(56) References Cited

U.S. PATENT DOCUMENTS

| | | |
|---|---|---|
| 5,491,769 A | 2/1996 | Moller |
| 6,058,338 A | 5/2000 | Agashe et al. |
| 6,671,620 B1 | 12/2003 | Garin et al. |
| 7,400,974 B2 | 7/2008 | Fuchs et al. |
| 7,593,365 B1 | 9/2009 | Delker et al. |

(Continued)

FOREIGN PATENT DOCUMENTS

| | | |
|---|---|---|
| CN | 103200678 A | 7/2013 |
| WO | WO-2009142943 A2 | 11/2009 |

(Continued)

OTHER PUBLICATIONS

International Search Report and Written Opinion—PCT/US2013/029538—ISA/EPO—dated Jul. 18, 2013.

*Primary Examiner* — Omoniyi Obayanju
(74) *Attorney, Agent, or Firm* — Silicon Valley Patent Group LLP

(57) ABSTRACT

A method and apparatus for reporting almanac versions and almanac identification by a mobile station to a server is provided. The server compares the almanac version and almanac identification held by the mobile station with almanac versions and almanac identifications held by the server. The server then sends instructions to the mobile station to match the server versions of the almanac versions and almanac identifications for the almanac versions and almanac identifications that the mobile station should hold.

30 Claims, 5 Drawing Sheets

(56) References Cited

U.S. PATENT DOCUMENTS

| | | |
|---|---|---|
| 8,032,151 B2 | 10/2011 | Paulson et al. |
| 8,190,730 B2 | 5/2012 | Dempsey |
| 8,644,853 B2 | 2/2014 | Moeglein et al. |
| 8,743,782 B1 | 6/2014 | Patel |
| 8,977,207 B2 | 3/2015 | Ledlie |
| 2002/0168985 A1* | 11/2002 | Zhao .................. G01S 19/05 455/456.1 |
| 2003/0050078 A1 | 3/2003 | Motegi et al. |
| 2004/0248586 A1 | 12/2004 | Patel et al. |
| 2004/0260622 A1* | 12/2004 | Chan .................. G06Q 10/10 705/26.1 |
| 2005/0077995 A1 | 4/2005 | Paulsen et al. |
| 2005/0195781 A1 | 9/2005 | Ikeda |
| 2006/0200843 A1 | 9/2006 | Morgan et al. |
| 2006/0265507 A1 | 11/2006 | Banga et al. |
| 2007/0258407 A1 | 11/2007 | Li et al. |
| 2007/0275734 A1* | 11/2007 | Gaal .................. G01S 19/25 455/456.6 |
| 2007/0281707 A1 | 12/2007 | Thomson et al. |
| 2008/0284646 A1 | 11/2008 | Walley et al. |
| 2010/0095293 A1* | 4/2010 | O'Neill .................. G06F 8/65 717/173 |
| 2011/0057836 A1 | 3/2011 | Ische et al. |
| 2011/0059756 A1 | 3/2011 | Moeglein et al. |
| 2011/0269479 A1 | 11/2011 | Ledlie |
| 2011/0291885 A1 | 12/2011 | Marshall et al. |
| 2012/0231808 A1 | 9/2012 | Moeglein |
| 2013/0035109 A1 | 2/2013 | Tsruya et al. |
| 2013/0267218 A1 | 10/2013 | Do et al. |
| 2013/0281111 A1 | 10/2013 | Syrjarinne et al. |
| 2014/0019246 A1 | 1/2014 | Fraccaroli |
| 2015/0080019 A1 | 3/2015 | Edge |
| 2015/0080020 A1 | 3/2015 | Edge |

FOREIGN PATENT DOCUMENTS

| | | |
|---|---|---|
| WO | WO-2011032027 A1 | 3/2011 |
| WO | WO-2011067466 A1 | 6/2011 |
| WO | WO-2011149781 A2 | 12/2011 |
| WO | WO-2013136129 A1 | 9/2013 |
| WO | WO-2013149382 A1 | 10/2013 |
| WO | WO-2014070398 | 5/2014 |

* cited by examiner

METHODS AND APPARATUS FOR EFFICIENT TRANSPORT AND MANAGEMENT OF A POSITIONING AND TIMING ALMANAC

CROSS REFERENCE TO RELATED APPLICATIONS

This application is a continuation application of pending U.S. patent application Ser. No. 13/439,686 filed Apr. 4, 2012, entitled "Methods and Apparatus for Efficient Transport and Management of a Positioning & Timing Almanac," which is assigned to the assignee hereof and hereby incorporated by reference in its entirety.

BACKGROUND

Field

The present disclosure relates generally to communication systems, and more particularly, to methods and apparatus for efficient transport and management of a positioning and timing almanac at mobile stations supported by a positioning assistance server.

Background

Wireless communication systems are widely deployed to provide various types of communication content such as voice, data, and so on. These systems may be multiple-access systems capable of supporting communications with multiple users by sharing the available system resources (e.g., bandwidth and transmit power). Examples of such multiple-access systems include code division multiple access (CDMA) systems, time division multiple access (TDMA) systems, frequency division multiple access (FDMA), 3GPP Long Term Evolution (LTE) systems, and orthogonal frequency division multiple access (OFDMA) systems.

Generally, a wireless multiple-access communication system may simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple-out (MIMO) system. The method and apparatus described herein may be used with a conventional wireless system or with a MIMO system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, where $N_S \geq \min \{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and/or frequency division duplex (FDD) systems. In a TDD system, the forward and reverse link transmissions are on the same frequency region so that the reciprocity principle allows the estimation of the forward link channel from the reverse link channel. This enables the base station to extract transmit beamforming gain on the forward link when the multiple antennas are available at the base station. In an FDD system, forward and reverse link transmissions are on different frequency regions.

As mobile stations have become more capable with more features provided use and reliance on those features has grown. One such feature is position location, commonly known as global positioning systems (GPS). Most users are familiar with GPS systems and have used them for locating points of interest or for obtaining directions. Terrestrial radio resources (e.g., cellular base stations, TV broadcasting, FM/AM radio signals and WiFi access points) are more widely used for positioning now because of increased availability for mobile stations. In order to take advantage of these communication receivers for positioning, additional information must be delivered to a mobile station for use with mobile based positioning.

The information package, often known as an almanac, grows quickly in size as it covers larger areas of transceivers with descriptions of their location, coverage, and clock calibration data. It is important to deliver the almanac efficiently with minimum cost. There is a need in the art for efficient almanac delivery and maintenance to reduce unnecessary transmissions between mobile stations and the server.

SUMMARY

Embodiments disclosed herein provide a method for almanac version control. The method comprises reporting almanac versions and almanac identification by a mobile station to a server. The mobile then receives instructions from the server to match the server versions of the almanac versions and almanac identifications held by the server for the almanac versions and almanac identifications that the mobile station should hold.

A further embodiment provides a method for selective downloading of almanac versions. The server receives almanac identifications and almanac versions from at least one mobile station. The server then compares the almanac versions and almanac identifications sent the by the at least one mobile station with the almanac versions and almanac identifications held by the server. The server then sends instructions to the mobile station to match the server versions of the almanac versions and almanac identifications for the almanac versions and identifications that the at least one mobile station should hold.

A still further embodiment provides a method for almanac version control. The method begins when a server generates a partition based on a privilege setting. The server then receives a request from at least one mobile station for almanac versions based on at least one of a latest version, a relevant version, and the privilege setting. The server then compares the server's almanac versions with the versions requested by the mobile station. The requested almanac is then sent to the mobile station.

A yet further embodiment provides a method for selective downloading of almanac versions. The method comprises the steps of: requesting, by a mobile station, almanac versions based on at least one of a latest version, a relevant version, and a privilege setting. The mobile stations then receive the requested version from the server and updates the version held by the mobile station.

An apparatus for almanac version control is provided in a further embodiment. The apparatus comprises: a server containing a database, wherein the server acts in conjunction with a processor for data aggregation and a processor for comparison. A release database and a partition database acting in conjunction with a partition manager processor. The apparatus also includes a processor for checking for reorganization flags and for comparing almanacs for version changes. A process then determines the existing partition organization and compares the existing partitions with the predetermined threshold size.

A still further embodiment provides: means for reporting almanac version and almanac identification by a mobile station to a server; means for receiving instructions from a server to match the server versions of the almanac versions and almanac identifications that the mobile station should hold.

Yet a further embodiment provides an apparatus for selecting downloading of almanac versions. The apparatus provides: means for requesting almanac versions based on at least one of a latest version, a relevant version, and a privilege setting; means for receiving the almanac version requested; and means for updating the requested version.

An additional embodiment provides a machine readable non-transitory computer readable medium comprising instructions, which when executed by a processor cause the processor to perform the steps of: reporting almanac versions and almanac identifications by a mobile station to a server; and receiving instructions from a server to match the server versions of the almanac version and almanac identifications held by the server for the almanac versions and almanac identifications that the mobile station should hold. A still further embodiment provides a machine readable non-transitory computer readable medium comprising instructions, which when executed by a processor cause the processor to perform the steps of: receiving almanac versions and almanac identifications from at least one mobile station; comparing the almanac versions and almanac identifications sent by the at least one mobile station with almanac versions and almanac identifications held by the server; and sending instructions to the mobile station to match the server version of the almanac versions and almanac identifications for the almanac version and identification that the at least one mobile station should hold.

DETAILED DESCRIPTION

Figure 1:
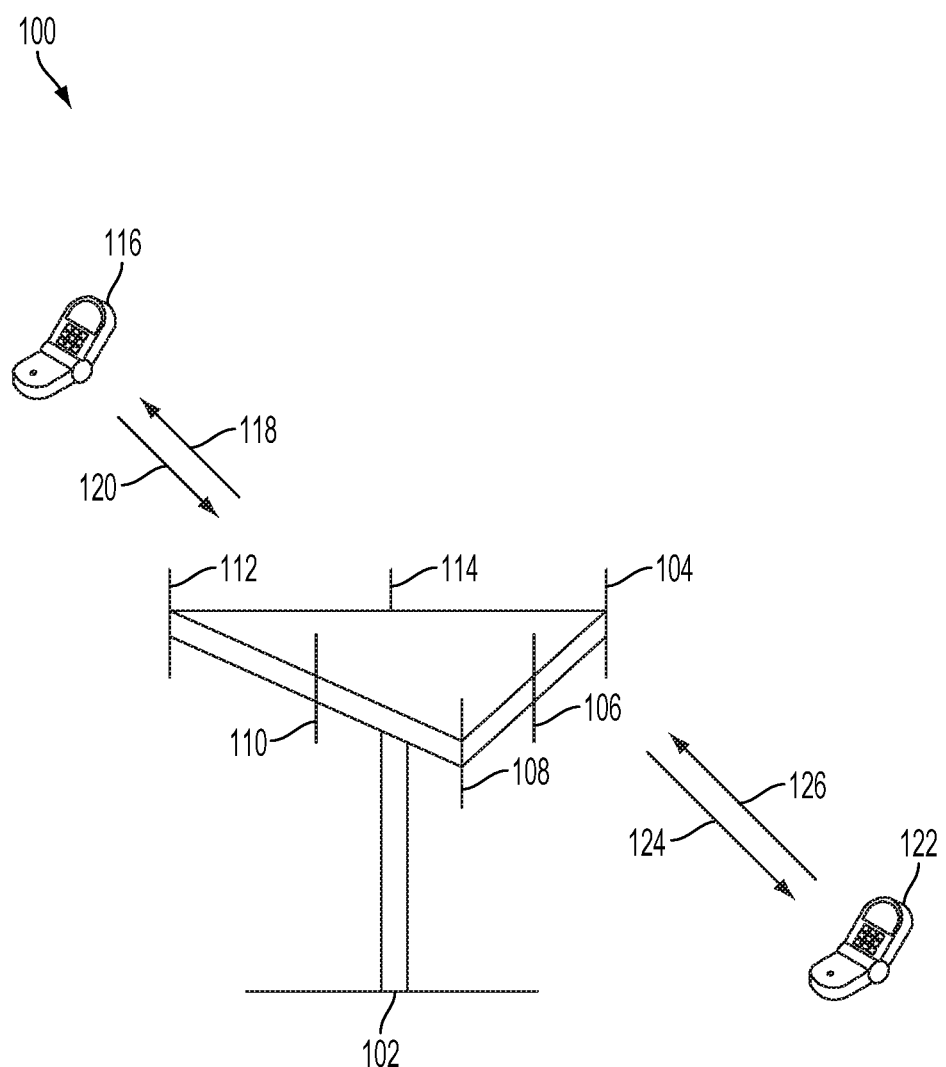
FIG. 1 illustrates a multiple access wireless communication system, in accordance with certain embodiments of the disclosure.

Various aspects are now described with reference to the drawings. In the following description, for purposes of explanation, numerous specific details are set forth in order to provide a thorough understanding of one or more aspects. It may be evident; however, that such aspect(s) may be practiced without these specific details.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to man an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband CDMA (W-CDMA). CDMA2000 covers IS-2000, IS-95 and technology such as Global System for Mobile Communication (GSM).

An OFDMA network may implement a radio technology such as Evolved UTRA (E-UTRA), the Institute of Electrical and Electronics Engineers (IEEE) 802.11, IEEE 802.16, IEEE 802.20, Flash-OFDAM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS, and LTE are described in documents from an organization named "3$^{rd}$ Generation Partnership Project" (3GPP). CDMA2000 is described in documents from an organization named "3$^{rd}$ Generation Partnership Project 2" (3GPP2). These various radio technologies and standards are known in the art. For clarity, certain aspects of the techniques are described below for LTE, and LTE terminology is used in much of the description below. It should be noted that the LTE terminology is used by way of illustration and the scope of the disclosure is not limited to LTE. Rather, the techniques described herein may be utilized in various application involving wireless transmissions, such as personal area networks (PANs), body area networks (BANs), location, Bluetooth, GPS, UWB, RFID, and the like. Further, the techniques may also be utilized in wired systems, such as cable modems, fiber-based systems, and the like.

Single carrier frequency division multiple access (SC-FDMA), which utilizes single carrier modulation and frequency domain equalization has similar performance and essentially the same overall complexity as those of an OFDMA system. SC-FDMA signal may have lower peak-to-average power ration (PAPR) because of its inherent single carrier structure. SC-FDMA may be used in the uplink communications where the lower PAPR greatly benefits the mobile terminal in terms of transmit power efficiency.

FIG. 1 illustrates a multiple access wireless communication system 100 according to one aspect. An access point 102 (AP) may include multiple antenna groups, one including 104 and 106, another including 108 and 110, and an additional one including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over downlink or forward link 118 and receive information from access terminal 116 over uplink or reverse link 120. Access terminal 122 is in communication with antennas 106 and 108, where antennas 106 and 108 transmit information to access terminal 122 over downlink or forward link 124 and receive information from access terminal 122 over uplink or reverse link 126. In a Frequency Division Duplex (FDD) system, communication links 118, 120, 124, and 126 may use a different frequency for communication. For example, downlink or forward link 118 may use a different frequency than that used by uplink or reverse link 120.

Each group of antennas and/or the area in which they are designed to communicate is often referred to as a sector of the access point. In an aspect, antenna groups each are designed to communicate to access terminals in a sector of the areas covered by access point 102.

In communication over downlinks or forward links 118 and 124, the transmitting antennas of access point may utilize beamforming in order to improve the signal-to-noise ratio (SNR) of downlinks or forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as a Node B, an evolved Node B (eNB), or some other terminology. An access terminal may also be called a mobile station, UE, a wireless communication device, terminal, or some other terminology. For certain aspects, either the AP 102, or the access terminals 116, 122 may utilize the proposed Tx-echo cancellation technique to improve performance of the system.

Figure 2:
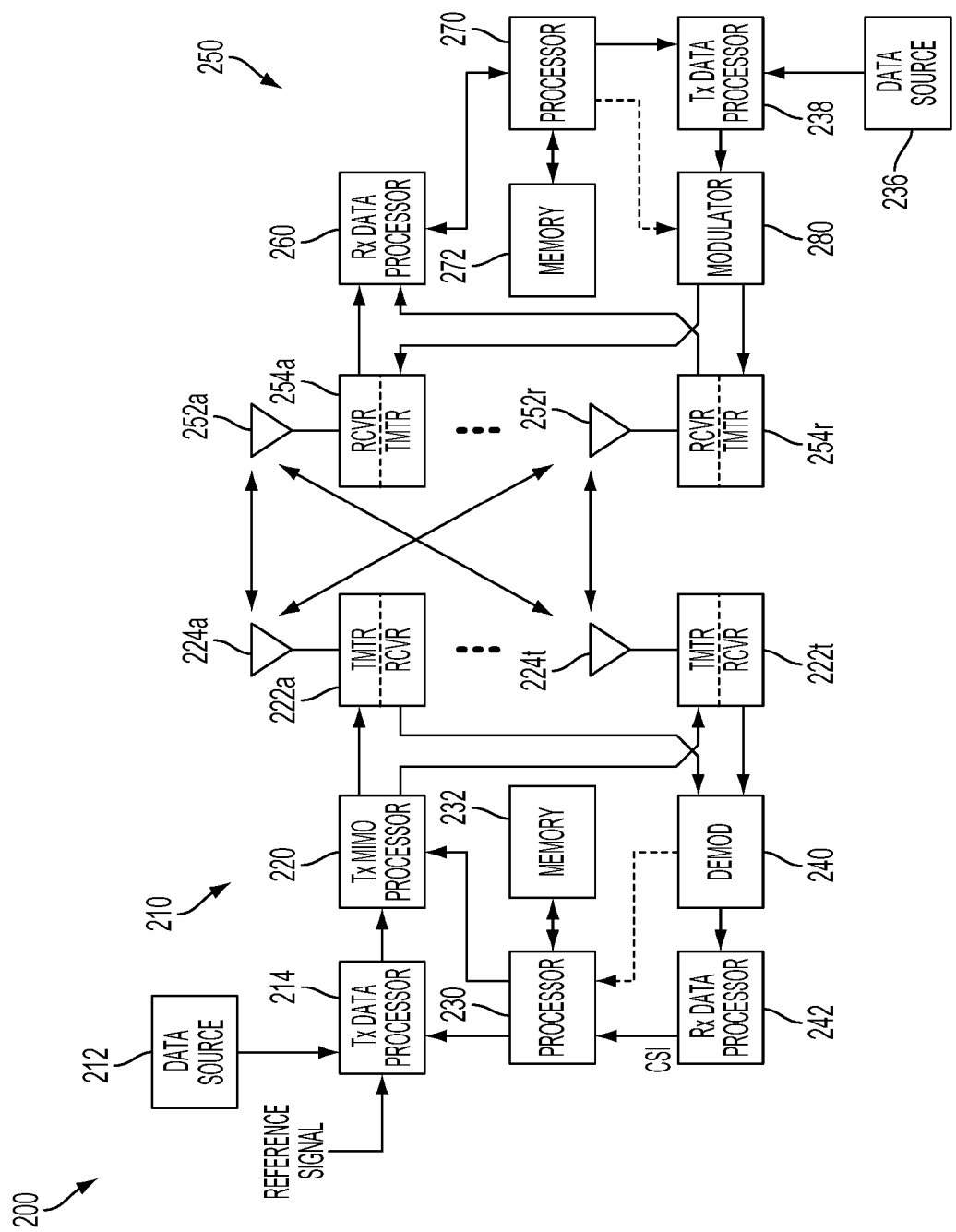
FIG. 2 illustrates a block diagram of a communication system in accordance with certain embodiments of the disclosure.

FIG. 2 is a block diagram of an aspect of a transmitter system 210 and a receiver system 250 in a MIMO system 200. At the transmitter system 210, traffic data for a number of data streams is provided from a data source 212 to a transmit (TX) data processor 214. An embodiment of the disclosure may also be applicable to a wireline (wired) equivalent of the system shown in FIG. 2.

In an aspect, each data stream is transmitted over a respective transmit antenna. TX data processor 214 formats, codes, and interleaves the traffic data for each data stream based on a particular coding scheme selected for that data stream to provided coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular based on a particular modulation scheme (e.g. a Binary Phase Shift Keying (BPSK), Quadrature Phase Shift Keying (QPSK), M-PSK in which M may be a power of two, or M-QAM, (Quadrature Amplitude Modulation)) selected for that data stream to provide modulation symbols. The data rate, coding, and modulation for each data stream may be determined by instructions performed by processor 230 that may be coupled with a memory 232.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel $N_T$ modulated signals from transmitters 222a through 222t are then transmitted from $N_T$ antennas 224a through 224t, respectively.

At receiver system 250, the transmitted modulated signals are received by the $N_R$ antennas 252a through 252r and the received signal from each antenna 252 is provided to a respective receiver (RCVR) 254a through 254r. each receiver 254 conditions (e.g., filters, amplifies, and down-converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX processor 260 is complementary to that performed by TX MIMO processor 220 and TX data processor 214 at transmitter system 210.

Processor 270, coupled to memory 272, formulates a reverse link message. The reverse link message may comprise various types of information regarding the communication link and/or the received data stream. The reverse link message is then processed by a TX data processor 238, which also receives traffic data for a number of data streams from data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240 and processed by a RX data processor 242 to extract the reserve link message transmitted by the receiver system 250.

Methods and apparatuses are provided that support efficient transport and management of a terrestrial radio resource almanac at mobile stations supported by a navigation assistance server.

Almanac version control is designed to minimize frequent unnecessary revisions of the almanac and the resulting data transactions between the mobile station and the server. Changes on each almanac partition as closely watched and selectively updated and distributed depending on their significance. The proposed almanac version control mechanism minimizes mobile downloading traffic and time by reducing any unnecessary revisions of the almanac.

The server prioritizes the almanac partitions to be downloaded and recommends their simple and efficient management at a mobile station. The partition selection is intended to provide a locally optimized set of partitions that are most relevant to the mobile station's current location. The partition management recommendations reduce the burden of partition management at a mobile station while preserving the mobile's right to keep the partitions it deems relevant and important. The proposed server intelligent almanac selection minimizes mobile downloading traffic and time by enhancing the relevance of the downloaded almanac to the current user's context based on mobile current or past context (e.g., current or past location, and the current or past list of partitions.)

Assistance data around cellular networks (e.g., BSA, SNA, and others) is used to illustrate the operation of the apparatus described herein, however, the methods and apparatus may be used in conjunction with any terrestrial radio source as well as any general positioning, timing, or contextual assistance information provided from a server to a mobile device to enhance the user's position or timing experience.

The almanac version control mechanism described herein minimizes mobile downloading traffic and time by reducing unnecessary almanac revisions. In addition, the proposed selective downloading protects the privacy and privilege of entities, (e.g., a wireless carrier, building owner, institution, or others) by enabling selective almanac downloading according to the given mobile station' privilege settings and the given almanac downloading permission settings. The proposed multi-layered mobile memory space enables a mobile to benefit from both public assistance almanacs and personalized mobile history (e.g., frequently visited places) as well as multiple memory spaces on mobiles with different speeds and sizes.

Figure 3:
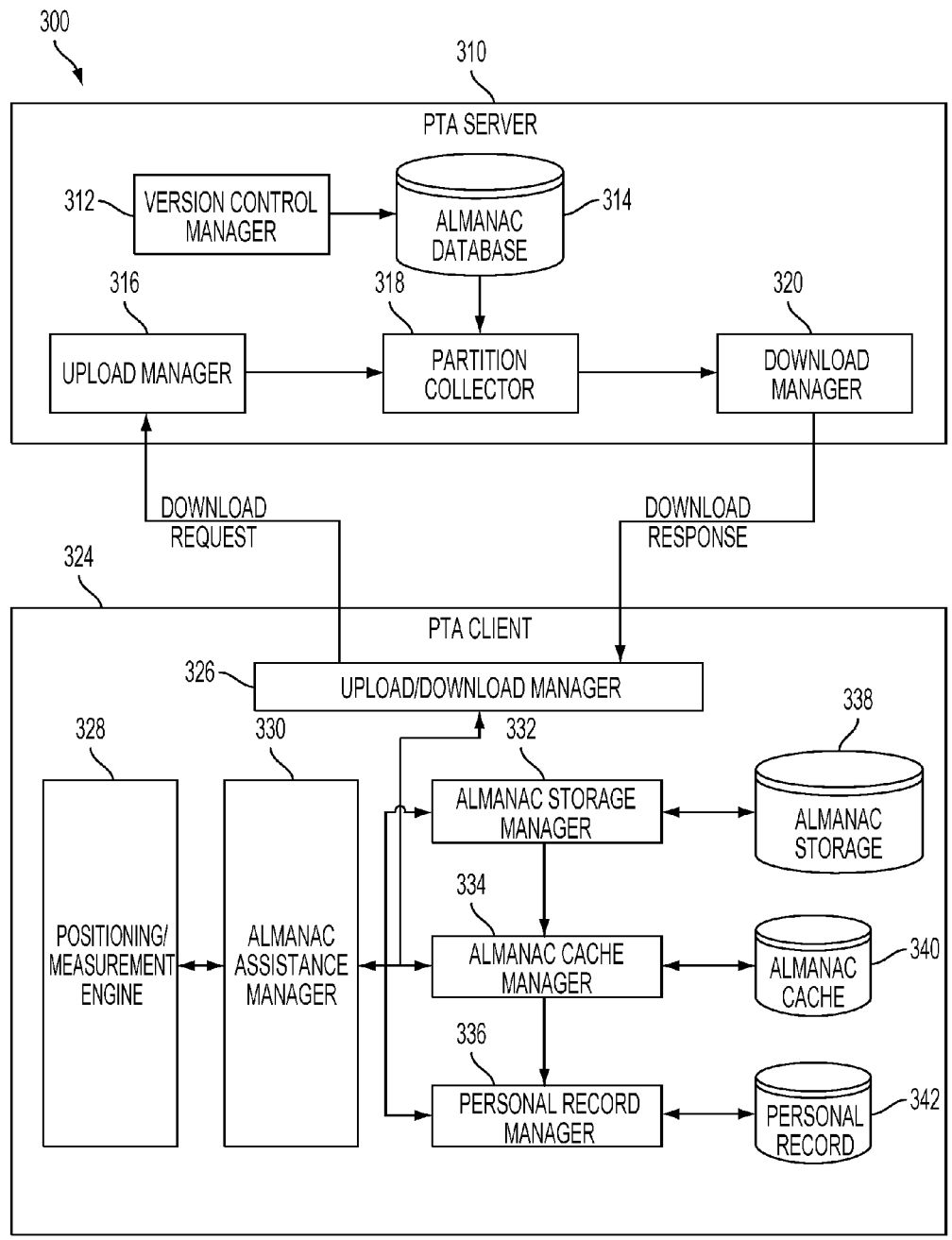
FIG. 3 is a diagram illustrating PTA system architecture.

FIG. 3 provides an overview of the context of the positioning and timing assistance (PTA) system, which includes PTA servers and PTA clients. The position and timing assistance (PTA) system 300 provides position and timing assistance to mobile stations or PTA clients 324 to enhance positioning operations. Position and timing assistance includes positioning assistance information such as terrestrial radio transmitter location, power level, expected range or coverage, timing/frequency bias and stability as well as data for the navigation satellites. A mobile or PTA client 324 uses the position and timing assistance to find the assistance information for the user's current positioning activity. For example, when a cellular base station is observed, the mobile station may use the location of the base station instantaneously if the base station is included in position and timing assistance in the mobile station's memory as a seed location to initialize the positioning calculation. This saves time and resources since the mobile station does not need to wait for assistance from a remote server.

The position and timing assistance system 300 comprises a PTA server 310 and a PTA client 324. The PTA server 310 includes a version control manager 312 that interfaces with almanac database 314. The almanac database 314 makes inputs to the partition collector 318. Partition collector 318 receives uploads from upload manager 316 and provides information to download manager 320.

Upload manager 316 receives a download request from the upload/download manager 326 of a PTA client 324. In turn, download manager 320 provides the requested download to PTA client 324, specifically the upload/download manager 326. PTA client 324 also includes positioning/measurement engine 328 that interfaces with almanac assistance manager 330. Almanac assistance manager 330 interfaces with almanac cache manager 334. Almanac storage manager 332 provides input to almanac cache manager 334, which also interfaces with the upload/download manager 326. Almanac cache manager 334 also provides inputs to the personal record manager 336. In addition the almanac storage manager 332 interfaces with personal record manager 336. Storage is provided for the almanac storage manager 332 in almanac storage 338. Almanac cache 340 provides storage for almanac cache manager 340. Personal record storage 342 provides storage for personal record manager 336.

The mobile station is the consumer of the positioning and timing assistance. It downloads position and timing assistance from the position and timing assistance PTA either periodically or as needed (e.g., when a terrestrial radio is observed but no information is available on the mobile), stores them in memory, and then uses this information to assist in the positioning process. The upload/download manager 326 handles the communication with the server 310 and internal requests for position and timing assistance downloading.

The search process is coordinated by the position and timing assistance manager. It receives assistance requests from the positioning/measurement engine 328 and initiates a search in the following order: the personal record 342 of the mobile station, the almanac cache 340, the almanac storage 338, and the position and timing assistance server 310. The search may also be performed in parallel if a faster search is needed or desired.

The positioning and timing assistance server 310 collects positioning assistance information, generates position timing and assistance and maintains records of the position and timing assistance requested. The upload manager 316 and download manager 320 interact with the mobile stations, PTA clients, 324; the partition collector 318 retrieves the position timing and assistance most relevant to the user's current location; and the version control manager 3112 maintains the position timing and assistance information in a current state.

The position, timing, and assistance almanac may include various types of information such as Spare network Almanac (SNA) and Base Station Almanac (BSA) information. Sparse network almanacs are, by definition, broad in scope of coverage, but have low precision, thus allowing a small amount of data to cover very broad areas. In contrast, a base station almanac is narrow in scope of coverage, but has high precision, and provides more detail.

Almanac download selection uses the proposed intelligent server almanac selection to minimize the mobile station's download traffic and time by enhancing the relevance of the downloaded almanac to the current user's context. That context is based on the mobile's current or past context (e.g., current or past location, the current or past list of partitions). The proposed mobile download feedback enhances the relevance of downloaded almanacs to the next mobile or mobiles to access the server by adaptively adjusting the server's almanac selection based on the mobile device's feedback (e.g., hit or miss, a list of utilized almanac version, a list of observed transmitters, and the like).

The carrier network may need to support multiple air interfaces and partitions need to be capable of working across air interfaces. This applies to both PTA-BSA and PTA-SNA partitions. As air interface types evolve, there are carrier networks and mobile phones supporting multiple air interface types (e.g., GSM/WCDMA networks). Within these networks, the mobile station switches between air interface types frequently and consequently could request multiple PTA downloads in a short period of time. In order to minimize there undesirably frequent download requests, it is preferable for the server to send PTAs for all of the corresponding air interface types. Regardless of whether the mobile is connected through a GSM or WCDMA network, the server sends both GSM and WCDMA PTA partitions for GSM and WCDMA dual-mode mobiles.

For convenience of PTA partition management, the PTA partitions belonging to different air interface types from a single carrier are managed separately as if they are from separate networks. The association between PTA partitions is maintained through the Cell ID indexing table. Cell ID is only one example, other mechanisms may be used, such as user position, neighboring AP MAC address/SSID, and may be used individually or in combination. Also, the other indexes may be pre-linked to a global index table. For example, the known AP MAC addresses or user positions are pre-assigned to neighboring Cell IDs and when this information is sent to the server, the server converts that information into a Cell ID and uses the Cell ID index table to get a partition list. In this way, each PTA partition can be managed independently and any combination of air interface types can be supported by simply picking and choosing the corresponding partitions from the Cell ID indexing table. Also, any new air interface types can be added simply by creating partitions from the Cell ID indexing table. Also, any new air interface types can be added simply by creating partitions for the new interface type, and updating the Cell ID indexing table without change to the existing partitions.

The server maintains information about carrier networks and their supported air interface types. The server also maintains a Cell ID indexing table including PTA-BSA partitions for all supported air interface types in the order of their proximity to the serving cell. Hence, the first partition includes the serving cell, followed by partitions containing co-located cells. The rest of the partitions are selected based on proximity to the serving cell. The server should distinguish the following: the partition with the serving cell, the partitions with the co-located cells, and the rest. For example, Cell ID #1 (a GSM cell) is indexed to PTA_BSA_GSM#3 (serving cell's partition), PTA_BSA_WCDMA_#5 (co-located cell's partition), PTA_BSA_WCDMA #1, PTA_GSM #1, PTA_BSA_WCDMA #4, PTA_BSA_GSM #9, . . . .

The server checks the mobile station's association with air interface types vi AIR_INTERFACE_TYPE in the PTA upload format. If the mobile station supports a single air interface type, the server sends the PTA partitions for the corresponding air interface type to the mobile in terms of BSA and SNA. For example, a GSM only mobile will receive PTA_SNA_GSM along with PTA_BSA_GWM #3, PTA_BSA_GSM#1, PTA_BSA_GSM#9, . . . . . If the mobile station supports multiple air interface types which are supported by the carrier, the server sends the PTA partitions for all air interface types of the mobile station in terms of BSA and SNA. For example, a GSM/WCDMA dual mode mobile station will receive PTA_SNA_GSM and PTA_SNA_WCDMA along with PTA_BSA_GSM#3, PTA_BSA_SCDMA#5, PTA_BSA_WCDMA#1, PTA_BSA_GSM#1, PTA_BSA_WCDMA #4, PTA_BSA_GSM#9, . . . .

The selection of download PTA-SNAs generally follows the same procedure as described above.

Download SNA partitions will be selected based on the mobile station's current serving Region ID (e.g., SID/NID, MNC/LAC, or MNC/RNC-ID) or the mobile station's current or past position.

The embodiments described herein for selective downloading protect the privacy and privilege of entities (e.g., a wireless carrier, building owner, institution, etc.) by enabling almanac downloading selectively according to a particular mobile device's privilege setting and the given almanac downloading permission setting. For example certain high security facility information could be protected from unauthorized personnel.

The mobile device's download privileges may be represented by explicit or pre-assigned privilege information. The mobile device's download privilege may also be derived from implicit information.

Explicit privilege information may include a global privilege setting, which permits distinguishing between premium users and basic users based on a service contract, association with entities, such as an employer or agency, or may use a unique device identifier. A unique device group identifier may also be used. If an individual device identification is not provided, or is not used, a group identification may be used to allow privilege setting for a group of devices. Explicit privilege information provides specific privilege limits on downloading of assistance data for each mobile device.

Implicit privilege information may include a device manufacturer, such as Samsung, HTC, or Nokia, device hardware and software versions where more detailed assistance is provided for users of more recent hardware and software with greater capabilities. The implicit privilege information may also include serving carrier, country, current location, current serving base station, currently associated WiFi AP, or other contextual information Implicit privilege information is used to derive the download privilege for a given mobile device context and may be applied adaptively, where the explicit privilege information is not adaptable.

The privilege information is intended to limit access to certain sets of information by a particular mobile device. In another embodiment, the privilege information may be used to provide assistance data of enhanced relevance to a mobile device depending on the mobile device's context.

Related entities, which may include building owners or carriers, may request adjustment of a mobile device's privilege setting to assist in downloading data. The privilege mapping may then be updated on the server and the information delivered to the affected mobile devices may be adjusted accordingly.

In yet another embodiment, privilege information may be handled either by the mobile device or by the server. The mobile device normally keeps or submits its privilege information to the server. The server then uses the privilege mapping table to map a given mobile device's privilege information to the downloadable information. In an additional embodiment, the server may remember the privilege setting of each mobile device based on each mobile device's unique identifier, where a mobile device submits only its identification information.

The almanac version control mechanism minimizes mobile downloading traffic and download time by reducing unnecessary almanac revisions. For clarification, "version" or "revision" refers strictly to CONTENT and not to the formats of the PTA partitions.

The PTA partition revision number will be incremented based on the degree of change of data, not the age of the file. This prevents downloading new PTA data for relatively minor changes, such as minor changes in coverage radius for a region in the partition.

The overall PTA partition generation procedure consists of two main functional blocks—data aggregation and partitioning manager, with the version control being conducted in coordination of these two blocks to support version control for each PTA partition.

Version control begins after PTAs are updated from third party uploads and stored in the latest PTA database. The version control (revision) process is performed as part of the overall PTA generation procedure, which will be described.

The PTA generation process beings for each network when the latest PTAs and the release version PTAs are fetched from the latest PTA database and the PTA release database. Then, the data is analyzed for revision triggering events: region reorganization, or significant region expansion/contraction/shift.

If the latest PTAs contain significant differences from the last released PTAs (qualified triggering events), the latest PTAs are copied to the PTA release database and become new release version PTAs. Upon revision, the data aggregation engine notifies the portioning manager with the list of affected cells or regions.

The partitioning manager checks for existing partitions for the newly released PTAs. If there are no existing partitions, partitioning is conducted and all partitions are initialized.

If there are existing partitions, the existing partition configuration should be applied (e.g., center circle location/radius and partitioning angles in case of the pie-slicing method) to the PTAs and a check made to see if the resulting partitions are legitimate, that is less than the partition size limit. If any partition is not legitimate, then partitioning in conduced. For example, if a new cell is reported in the region, the new cell may be inserted into an existing partition which geographically covers the new cell's center location. Or, if a cell center has moved from one partition area to another partition area, this cell's entry is moved between these two partitions. The next step is to check to see if the affected partitions are still within the partition size limit, (e.g., 2 Kbyte). If the partition size is within the partition size limit, no other partitions in this region need updating. If the partition size is not within the partition size limit, then partitioning is conducted and new partition regions with resulting new partitions are created.

The newly generated partitions are compared to the existing partitions and the partitions with changes are identified and updated. The comparison is based on the partition contents (e.g., list of cells, cell size, and cell center location), not on the partition configuration. The content comparison is intended to support mobile more efficiently when the mobiles care about the contents of partitions, not how the server generates the partitions. The updated partitions are then copied to the partition database for mobile download.

Figure 4:
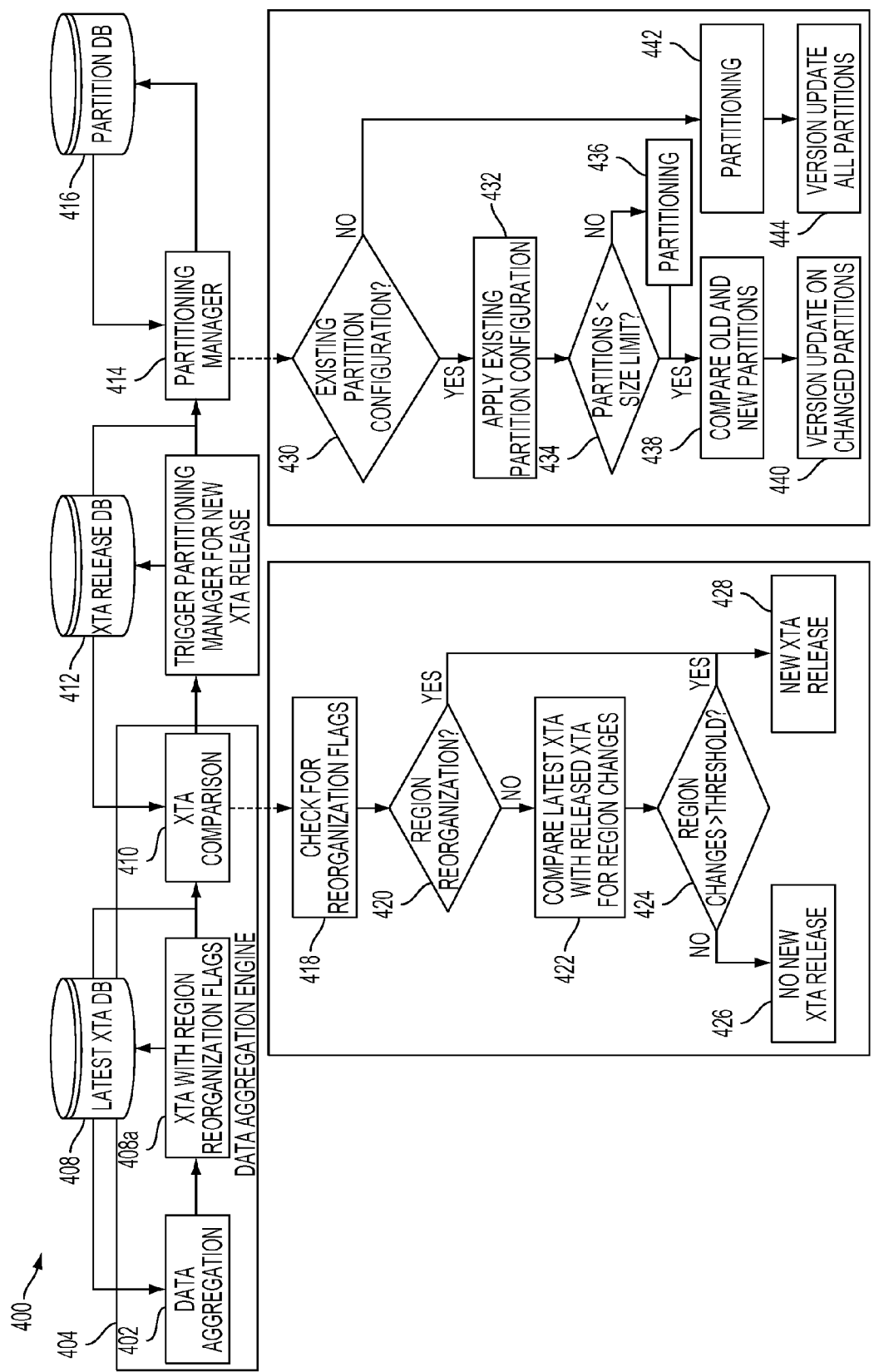
FIG. 4 illustrates the PTA revision process—coordination of data aggregation engine and partition manager.

FIG. 4 provides a flow chart of the process and illustrates the interaction with the databases. The system and method 400, operates with a data aggregation engine 402. This data aggregation engine 402 includes means for data aggregation 404, the latest PTA database 408 with PTA reorganization flags 408a, both of which are in communication with the means for PTA comparison 410. The PTA comparison means 410 is also in communication with the PTA release database 412, and includes a trigger partitioning manager for new PTA releases. The partitioning manager 414 receives inputs from PTA release database 412 and the PTA comparison means 410, as well as the partition database 416.

The process 400 begins with the PTA comparison means 410 initiating a check for reorganization flags in step 418. Specifically, a check is made to determine if there is any reorganization flag in the latest PTA. A query is then run in step 420 to check for region reorganization. The check includes looking for any region births or deaths, as well as renumbering. If the region is being reorganized the method proceeds to step 428 where a new PTA release is obtained. If the region is not being reorganized, the next step 422 compares the latest PTA with the released PTA for region changes. The change compares the latest PTA with the last released PTA and looks to see if there is any qualifying change for an PTA revision. The method checks for region changes that are greater than a specified threshold in step 424. If the changes are greater then the specified threshold, the method proceeds to step 428 where the new PTA release is obtained. If the changes do not exceed the threshold, there is not a new PTA release as shown in step 426.

The partitioning manager 414 implements partition changes to the partition configuration using the method described below. The method checks for an existing partition configuration at step 430, and specifically checks for an PTA partition. If the answer is no, the method continues to step 442 where partitioning occurs. In step 444 a version update is performed on all partitions. If there is an existing partition configuration then that existing partition configuration is applied in step 432. The existing partition may use angles or grids with the new PTA. The method next checks to see if the new or existing partitions are less than the partition size limit (bytes), in step 434. If the partitions are not below the partition size limit, the method continues to step 436 where partitioning occurs. If the partitions are below the partition size limit the old and new partitions are compared in step 438. In step 440 the partition version is updated based on the comparison performed in step 438.

The PTA version control includes both PTA-SNA and PTA-BSA, and may accommodate further partition variations. Except for the difference between member region definitions, (for CDMA, SIDs/NIDs for PTA-SNA and SIDs/NIDs/cells for PTA-BSA), all PTA version control follows the procedure described herein. In this context, "region" is more broadly defined and refers to any level of area designation used in XT including SID, NID, or a cell instead of the more narrow and usual reference to NIDs or LACs.

The PTA server processes BSA third party updates in a batch mode, on a network-by-network basis whose processing periodicity is typically one day. The next concern is when to increment the almanac version at the server. If an almanac has not changes, there is no need to increment the version number, so version control should be based on the degree of change, and not the age of the data. Version control based on the degree of change is helps minimize download data traffic to mobiles.

A PTA may change in two ways: region expansion/contraction/shift and region reorganization. In case of third party upload, region changes are not expected to occur frequently. The region expansion and contraction may be described by changes in region size (radius) and the region shift by changes in the center location. On the other hand, regions can be re-organized by a carrier as well. A new region may be created, a region may be removed, of the whole network can be re-numbered (changing only the identifiers without any physical change).

In general, the ordinary region expansion/contraction/shift event are expected to happen frequently, but to cause less significant changes, thus triggering PTA revision only if the accumulated changes are significant enough. Region reorganization events, however, are less frequent but may cause significant changes and are thus classified and treated separately from ordinary expansion or contraction events and triggering PTA revision automatically.

Table 1 provides a summary of PTA revision triggering events.

| Event Types | Parameters | Recommended Action | Comments |
|---|---|---|---|
| Region/cell Expansion/Contraction/Shift | Region center, Region size (radius) | PTA revision only in case of significant change above threshold | Frequent but less significant events |
| Region/cell Reorganization (Region birth*/death/renumbering**) | New/removed/renumbered PTA entry | Automatic PTA revision | Significant but infrequent events |

*Region birth refers to new region discovery by actual region reorganization or simply by first time user observation of an existing region.
**Data aggregation engine detects and sends flags for region reorganization events.

In the PTA revision process, region reorganization is a qualified event by default and automatically triggers PTA revision. Therefore, there is no separate threshold for region reorganization events. Here, region reorganization refers to an event that affects PTA entries. As one example, if it is PTA-SNA for CDMA, a new NID creation is a qualified reorganization but a new cell creation is not since this cell is not directly represented in SNA.

Ordinary region expansion/contraction/shift events are compared with thresholds to assess the significance of changes. Since the region expansion/contraction/shift events happen more frequently, these thresholds affect the overall frequency of PTA revision. As a consideration in setting these threshold values, the release version PTA should not deviate from the actual network too much, but at the same time should not be too frequent. Thus, the thresholds should be set to follow region changes closely while maintaining revision rate at a sustainable level.

These are two example parameters that may be used for version control, however, other parameters may be selected, such as region average altitude, antenna phase center, region population center, among others, may be tracked as well and used as criteria for partition version control. Here, the region center and size are shown as one example illustrating how to measure changes over time and also how to trigger a version update. The two parameters of interest are region center and size (radius). These changes are measured both in percentile and meters in order to monitor both relative and absolute changes. As one example, a revision may be triggered by either a 10% or a 10 Km change in size. The degree of change is measured as follows: first, measures the change on the region center of the individual regions. In this case, new refers to the latest PTA, while old refers to the release version PTA.

$$\text{Center change } (m) = \| \text{new center} - \text{old center} \|$$

$$\text{Center change ratio } (\%) = \frac{\| \text{new center} - \text{old center} \|}{\text{old radius}} \times 100$$

Second, measure the change on the region size of the individual regions.

$$\text{Size change } (m) = \| \text{new radius} - \text{old radius} \|$$

$$\text{Size change ratio } (\%) = \frac{\| \text{new radius} - \text{old radius} \|}{\text{old radius}} \times 100$$

Third, combine and take the average degree of changes from all regions in this PTA.

$$\text{Average center change ratio } (\%) = \sum_{All\ regions} \frac{\text{center change ratio}}{\text{number of regions}}$$

$$\text{Average size change ratio } (\%) = \sum_{All\ regions} \frac{\text{size change ratio}}{\text{number of regions}}$$

Based on the computed absolute or relative degree of changes, apply the corresponding thresholds given below in Table 2, which captures both local changes on individual member regions and accumulated changes throughout all regions in this PTA. The thresholds are given separately for PTA-SNA and PTA-BSA. For PTA-SNA, thresholds for SID/NID, MNC/LAC, or MNC/RNC are given.

For PTA-BSA, thresholds are given only for cells to detect only cell changes since the cells are the primary contents of BSA. Consequently, in PTA-BSA, changes in SID/NID, MNC/LAC, or MNC/RNC may not be updated as they are in PTA-SNA and do not trigger revision of PTA-BSA. This avoids any avalanching PTA-BSA revisions due to a single change in one region. If one NID has changed significantly and caused a change in SID, then all BSAs under this SID are affected, although other NIDs have not changed. To prevent this avalanching PTA revision, only cell changes are considered in PTA-BSA revision.

In a PTA-BSA partition, SID or NID values may not be the same as the corresponding values in a PTA-SNA since SID or NID values are used as a reference to support the efficient representation of the primary contents of PTA-BSA, which are the cell values. These reference values, (SID/NID, MNC/LAC, or MNC/RNC) are updated only when the cell descriptions need to be updated in the PTA-BSA. If an accurate and latest description of SID or NID is required, the PTA-SNA should be referenced, while the PTA-BSA is used to provide an accurate description of cells.

The PTA revision is triggered if any of the corresponding thresholds is met or exceeded. The thresholds are to be adjusted as tested through mobile uploads and for optimization per radio access technology, separate tables of thresholds are created and maintained for each radio access technology.

TABLE 2

PTA-SNA degree of change and thresholds (CDMA)

| Region Level | Parameters | Threshold* |
| --- | --- | --- |
| SID** | Center | 10% or 25 Km |
| | Size (Radius) | 10% or 25 Km |
| NID** | Center | 20% or 10 Km |
| | Size (Radius) | 20% or 10 Km |
| Combined*** | Center | 5% |
| (all SIDs/NIDs) | Size (Radius) | 5% |

*Change ration is normalized by region size (radius)
**Thresholds to detect local changes on any single region in this PTA although the rest of the regions are unchanged.
***Thresholds to detect global changes on all regions in this PTA, only applicable if there are multiple regions in this PTA.

The degree of changed and the thresholds may vary depending on the wireless system as well as the system operating constraints.

Figure 5:
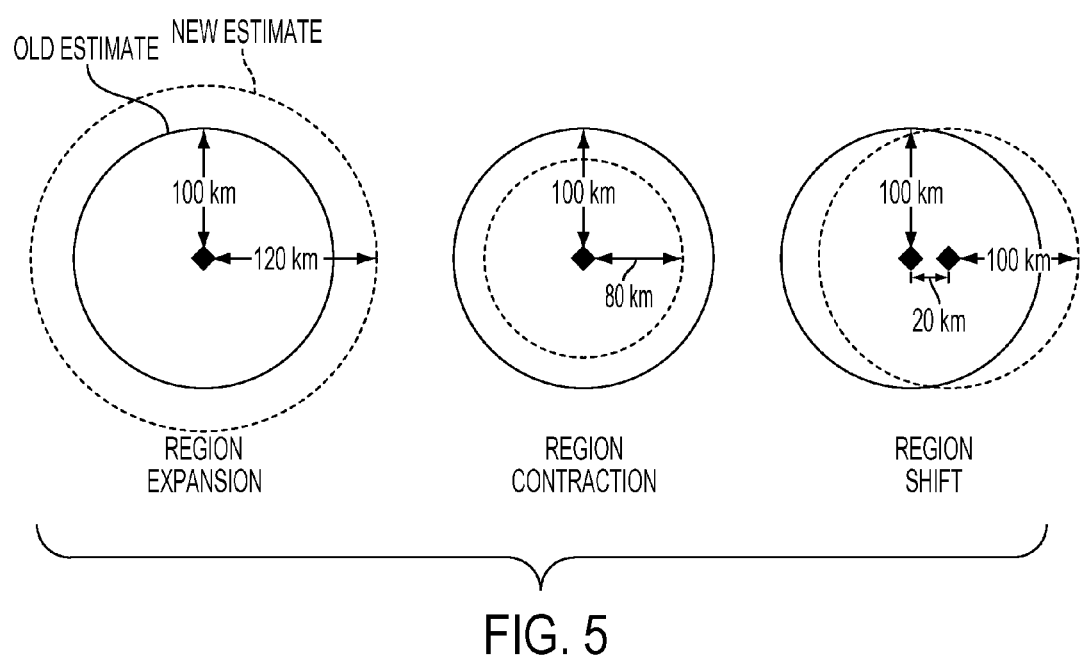
FIG. 5 depicts examples of PTA revision triggering events.

FIG. 5 illustrates triggering events in comparison with the thresholds. In FIG. 5, region expansion, contraction, and shift cases are illustrated. As one example, assuming thresholds of 10 km and 10%, if a region is observed to have grown, the new estimate has a bigger radius (120 km) than the existing estimate (100 km). In this case, the size change is 20 km and the size change ration is 20%. Since the changes are larger than the corresponding thresholds (10 km and 10%) a new PTA is released. The contracts and shift cases experience the same degree of changes and also trigger PTA revision.

For tracking freshness of individual PTA entries, time stamps for each PTA entry are kept and updated when new mobile or third party upload data is reported for the corresponding region. Even if the PTA entries are not changed based on the new data, time stamps are still generated upon the latest upload data as an indication of the freshness of individual PTA entries.

Time stamps are kept because regions in a PTA may experience different rates of mobile uploads. In a PTA, there will be regions more or less frequently visited by mobiles. Other regions are more frequently visited by mobiles and as a result are updated more frequently. This leads to less frequently visited regions having much older PTA entries.

Within the PTA server, GPS week and GPS milliseconds are used as timestamps. Here, the time resolution does not need to be in milliseconds and resolution within one day should be sufficient, as the PTA is expected to be updated in a 24 hour cycle. However, in order to be consistent with other time stamps in XT, this form of time stamp is used which could be revised if necessary.

Table 3 shows an example of the form and length of the time stamps that may be used.

| Time Stamp | Length (bits) | Note |
| --- | --- | --- |
| GpsWeek | 16 | GPS week when this PTA entry is updated with new mobile/third party upload |
| GpsMs | 32 | GPS milliseconds |

The PTA may contain information accuracy, reliability, and freshness indicators which a mobile may use to determine how accurate, how reliable, and how fresh the information is in the PTA. This information may be detailed or may be more concise. For example, if PTA freshness may be indicated in the time stamp in the time of PTA generation, or may be more compact when quantized as a few bits of an indicator. These indicators are used to minimize download data traffic by providing PTA quality information to the mobile so that a mobile may avoid unnecessary data downloading (e.g., download only old, unreliable, or inaccurate PTA). Even in the case of downloading, the mobile and the server may exchange these light weight indicators before actual PTA downloading so that only the needed partitions, specifically, those in need of updating, are updated. In one example of indicator use at a mobile, a mobile may use this freshness indicator to resolve any possible conflicts between that the mobile observes and what the PTA server tells the mobile. If the discrepancy is real and reported by many mobiles simultaneously to the PTA server, the corresponding PTA will be updated. This mechanism addresses the time gap between when the mobile station observes the discrepancy and when the PTA is actually being updated in a way that the mobile makes its own decision whether or not to trust the current PTA based on the given indicator before the actual PTA update by the PTA server, which usually takes time.

Table 5 illustrates an example of PTA freshness indicators for a mobile station.

| Estimation age | 3 | 0 | ≤1 day |
| --- | --- | --- | --- |
| | | 1 | >1 day and ≤1 week |
| | | 2 | >1 week and ≤2 weeks |
| | | 3 | >2 weeks and ≤1 month |
| | | 4 | >1 month and ≤4 months |
| | | 5 | >4 months and ≤1 year |
| | | 6 | >1 year |
| | | 7 | reserved |

The embodiments described herein provide numerous advantages over other methods. The proposed mobile local search within its storage and cache reduces traffic to the server and accompanying communication cost, and may also save time.

The described pre-loading method to the mobile storage enables stand alone operation.

In addition, the proposed predictive loading (either mobile to server, or mobile internally) enables faster preparation of the necessary almanac, and reduces positioning delay, based on a projected route from among probable routes based on crowd sourcing, user input destination, or application layer information (navigation software routing information).

The proposed almanac selective downloading also protects the privacy and privilege of entities (e.g., wireless carrier, building owner, or an institution, or similar) by enabling selective almanac downloading according to the given mobile's privilege setting and the given almanac downloading permission setting.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A processor-implemented method for almanac version control, comprising:
reporting, by a mobile station (MS), a plurality of MS-held version identifiers to a server, wherein:
each MS-held version identifier corresponds to a distinct MS-held partitioned terrestrial radio resource almanac version of a plurality of MS-held partitioned terrestrial radio resource almanac versions, and,
each partitioned terrestrial radio resource almanac version corresponds to a geographical region and comprises assistance data to enable the MS to perform positioning based on signals received by the MS from one or more terrestrial radio sources in the geographic region corresponding to the partitioned terrestrial radio resource almanac version;
receiving, at the MS, in response to the plurality of MS-held version identifiers reported by the MS, information to enable the MS to determine whether to update one or more of the plurality of MS-held partitioned terrestrial radio resource almanac versions; and
determining, by the MS, based, in part, on the received information, whether to update the one or more of the plurality of MS-held partitioned terrestrial radio resource almanac versions.

2. The processor-implemented method of claim 1, further comprising:
requesting, by the MS, at least one server-held terrestrial radio resource almanac version based on the determining; and
receiving, by the MS, the at least one server-held terrestrial radio resource almanac version.

3. The processor-implemented method of claim 2, further comprising:
updating the one or more of the plurality of MS-held partitioned terrestrial radio resource almanac versions by performing at least one of:
adding the at least one server-held terrestrial radio resource almanac version to the plurality of MS-held partitioned terrestrial radio resource almanac versions; or
replacing at least one of the plurality of MS-held partitioned terrestrial radio resource almanac versions with the at least one server-held terrestrial radio resource almanac version.

4. The processor-implemented method of claim 2, wherein the at least one server-held terrestrial radio resource almanac version received by the MS is based, in part, on one or more privilege settings associated with the MS.

5. The method of claim 4, wherein the one or more privilege settings associated with the MS may comprise at least one of:
a global privilege setting indicative of a premium user-classification or a basic user-classification; or
a group privilege setting based on an association of the MS with a group identifier; or
an implicit privilege setting based, in part, on characteristics of the MS.

6. The processor-implemented method of claim 4, wherein the request for the at least one server-held terrestrial radio resource almanac version comprises at least one of the one or more privilege settings associated with the MS.

7. The processor-implemented method of claim 1, wherein the received information comprises one or more server-held version identifiers, wherein each server-held version identifier corresponds to a distinct server-held terrestrial radio resource almanac version.

8. The processor-implemented method of claim 1, wherein determining whether to update the one or more of the plurality of MS-held partitioned terrestrial radio resource almanac versions is based further on at least one of:
a current location of the MS, or
a history of locations of the MS.

9. A mobile station (MS) comprising:
a memory, the memory to hold a plurality of MS-held partitioned terrestrial radio resource almanac versions, wherein:
each MS-held partitioned terrestrial radio resource almanac version is associated with a distinct MS-held version identifier, and,
each partitioned terrestrial radio resource almanac version corresponds to a geographical region and comprises assistance data to enable the MS to perform positioning based on signals received by the MS from one or more terrestrial radio sources in the geographic region corresponding to the partitioned terrestrial radio resource almanac version; and
a processor coupled to the memory, wherein the processor is configured to:
report a plurality of MS-held version identifiers to a server;
receive, in response to the reported MS-held version identifiers, information to enable the MS to determine whether to update one or more of the plurality of MS-held partitioned terrestrial radio resource almanac versions; and
determine, based, in part, on the received information, whether to update the one or more of plurality of MS-held partitioned terrestrial radio resource almanac versions.

10. The MS of claim 9, wherein the processor is further configured to:
request at least one server-held terrestrial radio resource almanac version based on the determining; and
receive the at least one server-held terrestrial radio resource almanac version.

11. The MS of claim 10, wherein the processor is further configured to:
update the one or more of the plurality of MS-held partitioned terrestrial radio resource almanac versions by performing at least one of:
adding the at least one server-held terrestrial radio resource almanac version to the plurality of MS-held partitioned terrestrial radio resource almanac versions; or
replacing at least one of the plurality of MS-held partitioned terrestrial radio resource almanac versions with the at least one server-held terrestrial radio resource almanac version.

12. The MS of claim 10, wherein the at least one received server-held terrestrial radio resource almanac version is based, in part, on one or more privilege settings associated with the MS.

13. The MS of claim 12, wherein the one or more privilege settings associated with the MS may comprise at least one of:
- a global privilege setting indicative of a premium user-classification or a basic user-classification; or
- a group privilege setting based on an association of the MS with a group identifier; or
- an implicit privilege setting based on characteristics of the MS.

14. The MS of claim 12, wherein the request for the at least one server-held terrestrial radio resource almanac version comprises at least one of the one or more privilege settings associated with the MS.

15. The MS of claim 9, wherein the received information comprises one or more server-held version identifiers, wherein each server-held version identifier corresponds to a distinct server-held terrestrial radio resource almanac version.

16. The MS of claim 9, wherein the processor is configured to determine whether to update the one or more of the plurality of MS-held partitioned terrestrial radio resource almanac versions based further on at least one of:
- a current location of the MS, or
- a history of locations of the MS.

17. A mobile station (MS) comprising:
- means for reporting a plurality of MS-held version identifiers to a server, wherein:
  - each MS-held version identifier corresponds to a distinct MS-held partitioned terrestrial radio resource almanac version of a plurality of MS-held partitioned terrestrial radio resource almanac versions, and,
  - each terrestrial radio resource almanac version comprises assistance data to enable the MS to perform positioning based on signals received by the MS from one or more terrestrial radio sources in a geographic region corresponding to the partitioned terrestrial radio resource almanac version;
- means for receiving in response to the MS-held version identifiers reported by the MS, information to enable the MS to determine whether to update one or more of the plurality of MS-held partitioned terrestrial radio resource almanac versions; and
- means for determining based, in part, on the received information, whether to update the one or more of the plurality of MS-held partitioned terrestrial radio resource almanac versions.

18. The MS of claim 17, further comprising:
- means for requesting at least one server-held terrestrial radio resource almanac version based on the determining; and
- means for receiving the at least one server-held terrestrial radio resource almanac version.

19. The MS of claim 18, further comprising:
- means for updating the one or more of the plurality of MS-held partitioned terrestrial radio resource almanac versions, the means for updating further comprising at least one of:
  - means for adding the at least one server-held terrestrial radio resource almanac version to the plurality of MS-held partitioned terrestrial radio resource almanac versions; or
  - means for replacing at least one of the plurality of MS-held partitioned terrestrial radio resource almanac versions with the at least one server-held terrestrial radio resource almanac version.

20. The MS of claim 18, wherein the received at least one server-held terrestrial radio resource almanac version is based, in part, on one or more privilege settings associated with the MS.

21. The MS of claim 20, wherein the one or more privilege settings associated with the MS may comprise at least one of:
- a global privilege setting indicative of a premium user-classification or a basic user-classification; or
- a group privilege setting based on an association of the MS with a group identifier; or
- an implicit privilege setting based on characteristics of the MS.

22. The MS of claim 17, wherein the received information comprises one or more server-held version identifiers, wherein each server-held version identifier corresponds to a distinct server-held terrestrial radio resource almanac version.

23. The MS of claim 17, wherein the means for determining determines whether to update the one or more of the plurality of MS-held partitioned terrestrial radio resource almanac versions based further on at least one of:
- a current location of the MS, or
- a history of locations of the MS.

24. A non-transitory computer-readable medium comprising instructions for almanac version control, the instructions executable by a processor on a Mobile Station (MS) to:
- report a plurality of MS-held version identifiers to a server, wherein:
  - each MS-held version identifier corresponds to a distinct MS-held partitioned terrestrial radio resource almanac version of a plurality of MS-held partitioned terrestrial radio resource almanac versions, and,
  - each partitioned terrestrial radio resource almanac version comprises assistance data to enable the MS to perform positioning based on signals received by the MS from one or more terrestrial radio sources in a geographic region corresponding to the partitioned terrestrial radio resource almanac version;
- receive in response to the MS-held version identifiers reported by the MS, information to enable the MS to determine whether to update one or more of the plurality of MS-held partitioned terrestrial radio resource almanac versions; and
- determine based, in part, on the received information, whether to update the one or more of the plurality of MS-held partitioned terrestrial radio resource almanac versions.

25. The computer-readable medium of claim 24, further comprising instructions executable by the processor to:
- request at least one server-held terrestrial radio resource almanac versions based on the determining; and
- receive the at least one server-held terrestrial radio resource almanac version.

26. The computer-readable medium of claim 25, further comprising instructions executable by the processor to:
- update the one or more of the plurality of MS-held partitioned terrestrial radio resource almanac versions by performing at least one of:
  - adding the at least one server-held terrestrial radio resource almanac version to the plurality of MS-held partitioned terrestrial radio resource almanac versions; or
  - replacing at least one of the plurality of MS-held partitioned terrestrial radio resource almanac versions with the at least one server-held terrestrial radio resource almanac version.

27. The computer-readable medium of claim 25, wherein the at least one received server-held terrestrial radio resource almanac version is based, in part, on one or more privilege settings associated with the MS.

28. The computer-readable medium of claim 27, wherein the one or more privilege settings associated with the MS may comprise at least one of:
 a global privilege setting indicative of a premium user-classification or a basic user-classification; or
 a group privilege setting based on an association of the MS with a group identifier; or
 an implicit privilege setting based on characteristics of the MS.

29. The computer-readable medium of claim 24, wherein the received information comprises one or more server-held version identifiers, wherein each server-held version identifier corresponds to a distinct server-held terrestrial radio resource almanac version.

30. The computer-readable medium of claim 24, wherein the determination of whether to update the one or more of the plurality of the MS-held partitioned terrestrial radio resource almanac versions is based further on at least one of:
 a current location of the MS, or
 a history of locations of the MS.

* * * * *